Dec. 9, 1969   J. C. KIDBY   3,482,829
VEHICLE SHOCK ABSORBING SUSPENSION UNITS
Filed July 31, 1967   3 Sheets-Sheet 1

INVENTOR
JAMES C. KIDBY
BY
Watson, Cole, Grindle + Watson
ATTORNEYS

Dec. 9, 1969 J. C. KIDBY 3,482,829
VEHICLE SHOCK ABSORBING SUSPENSION UNITS
Filed July 31, 1967 3 Sheets-Sheet 2

INVENTOR
JAMES C. KIDBY
BY
Watson, Cole, Grindle + Watson
ATTORNEYS

Dec. 9, 1969   J. C. KIDBY   3,482,829
VEHICLE SHOCK ABSORBING SUSPENSION UNITS
Filed July 31, 1967   3 Sheets-Sheet 3

INVENTOR
JAMES C. KIDBY
BY
*Watson, Cole, Grindle + Watson*
ATTORNEYS

United States Patent Office 3,482,829
Patented Dec. 9, 1969

3,482,829
VEHICLE SHOCK ABSORBING SUSPENSION UNITS
James C. Kidby, Crawley, England, assignor to Silentbloc Limited
Filed July 31, 1967, Ser. No. 657,174
Claims priority, application Great Britain, Aug. 1, 1966, 34,382/66
Int. Cl. B62d 7/08; B60b 35/18; F16f 1/38
U.S. Cl. 267—35                                                          4 Claims

ABSTRACT OF THE DISCLOSURE

A flexible mounting for attachment of the upper end of a strut type vehicle shock absorbing suspension unit to sprung mass of the vehicle comprising a flexible bushing connected at its outer periphery to the sprung mass of the vehicle, a sleeve rigidly secured to its inner periphery and having an outwardly directed flange at its lower end, a pin mounted on the upper end of the suspension unit and received within the sleeve, a flange on the suspension unit extending substantially parallel to the outwardly directed flange on the sleeve and spaced below it, and a non-metallic material interposed between the sleeve and its associated flange and the pin and the flange upon the suspension unit, the non-metallic material being formed to provide a permanently lubricated bearing.

---

Figure 1:
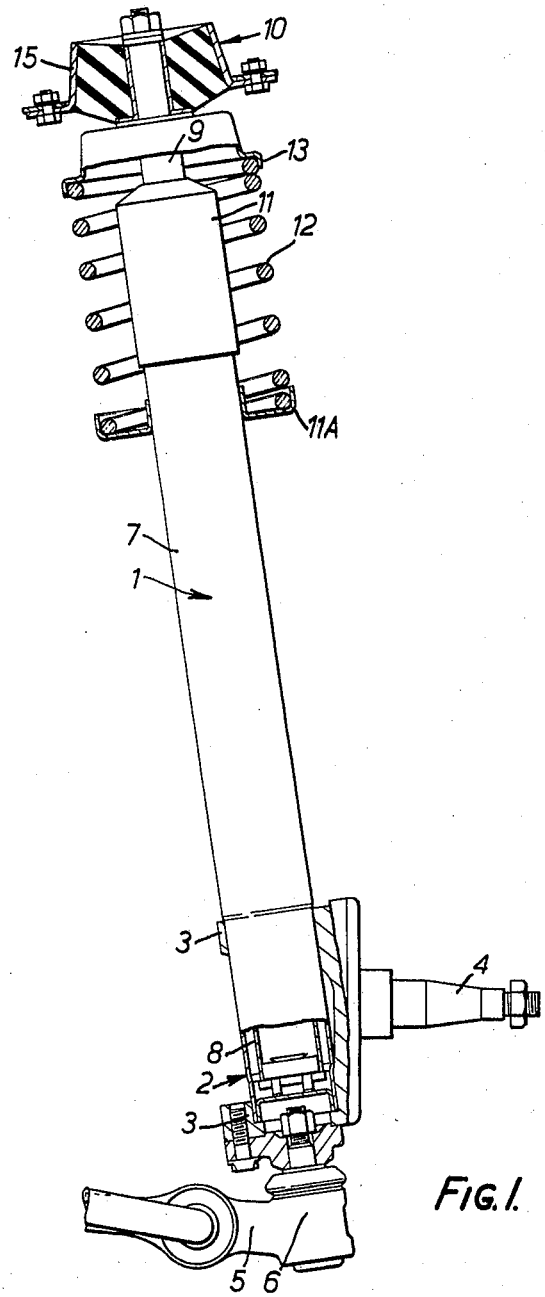

This invention relates to vehicle suspension units and is more particularly concerned with "strut" type suspension units, that is to say suspension units in which the unsprung part of the suspension is formed by a stub axle assembly on which a road wheel is mounted, the assembly being connected to the sprung mass of the vehicle by mechanism including an elongated member or strut and incorporating a vibration damper or so-called shock absorber and a spring.

The shock absorber incorporated in the unit is normally of the telescopic type, that is to say of the kind comprising a working cylinder closed at one end and having extending through a fluid seal in the other end a piston rod, and conveniently arranged so that the upper end of the piston rod is attached to the sprung part of the vehicle while the working cylinder is connected to the stub axle assembly. The lower end of the piston rod is connected to a piston in the working cylinder which contains valve controlled passages and by means of which damping of vibrations is effected in conventional manner.

The springing connecting the sprung mass of vehicle to the unsprung mass may be leaf springs or coil springs, or torsion bar suspension may be used. When leaf springs are used they are normally mounted transversely with one end connected to the stub axle assembly and the other end connected to the sprung mass, while when coil springs are used they are normally positioned surrounding the strut with one end connected to and serving to support the sprung mass while the other end is secured to retaining means on the strut. When torsion bar suspension is used this is arranged with an arm connecting the torsion bar to the stub axle assembly.

The invention is concerned with such strut type suspension systems in which the stub axle assembly together with the whole body of the strut is rotatable about an approximately vertical axis with respect to the sprung mass of a vehicle, and in which for this purpose the attachment of the upper end of the strut to the sprung mass of the vehicle permits such pivotal movement to take place.

In such strut type suspension systems as at present in use the upper end of the strut is attached to the sprung mass of vehicle through flexible bushings of tubular form, the outer periphery of the bushing being rigidly connected to the sprung mass while the inner periphery has rigidly connected thereto a metallic ball or roller thrust form of bearing to which the upper end of the suspension unit is affixed.

The metallic thrust bearing is expensive, requires lubrication and is particularly difficult to seal against the ingress of water, dirt and the like as the suspension is normally placed against the wheels and these tend to throw up water and dirt which penetrate into the bearing and wash out the grease and lubricants.

According to the present invention a flexible mounting for attachment of the upper end of a vehicle suspension unit to the body or chassis of the vehicle comprises a flexible bushing connected at its outer periphery to the body or chassis of the vehicle, a sleeve rigidly secured to its inner periphery having an outwardly directed flange at its lower end, a pin mounted on the upper end of the suspension unit and received within the sleeve, a flange on the suspension unit extending substantially parallel to the outwardly directed flange on the sleeve and spaced below it, and a non-metallic material interposed between the sleeve and its associated flange and the pin and the flange upon the suspension unit, the non-metallic material being formed to provide a permanently lubricated bearing.

Thus in a strut type suspension unit according to the present invention the upper end of the unit is connected to the sprung mass of the vehicle by a flexible mounting which comprises a flexible bushing rigidly connected at its outer periphery to the sprung mass of the vehicle, a sleeve rigidly secured to its inner periphery and having an outwardly directed flange at its lower end, a pin mounted on the upper end of the suspension unit and received within the sleeve, a flange on the suspension unit extending substantially parallel to the outwardly directed flange on the sleeve and spaced below it, and a non-metallic material such as polyurethane interposed between the sleeve and its associated flange and the pin and the flange upon the suspension unit, the non-metallic material providing a permanently lubricated bearing.

The permanently lubricated bearing referred to is of conventional form and is constructed by having a non-metallic material fixed in relation to one of the relatively rotatable parts while grooves or pockets are formed by suitable identations which are provide in at least one of the surfaces between which relative rotation takes place, the ends of the non-metallic material being suitably formed to prevent grease or other lubricant which is packed into the assembly from escaping so that the bearing is lubricated and sealed for life.

In the present invention the non-metallic material forming the permanently lubricated bearing is preferably fixed with respect to the pin so that relative rotation takes place between the non-metallic material and the sleeve. In one construction the underside of the part of the permanently lubricated material interposed between the flange on the sleeve and the flange on the suspension unit is provided with projecting studs engaging openings in the flange on the suspension unit.

Figure 2:
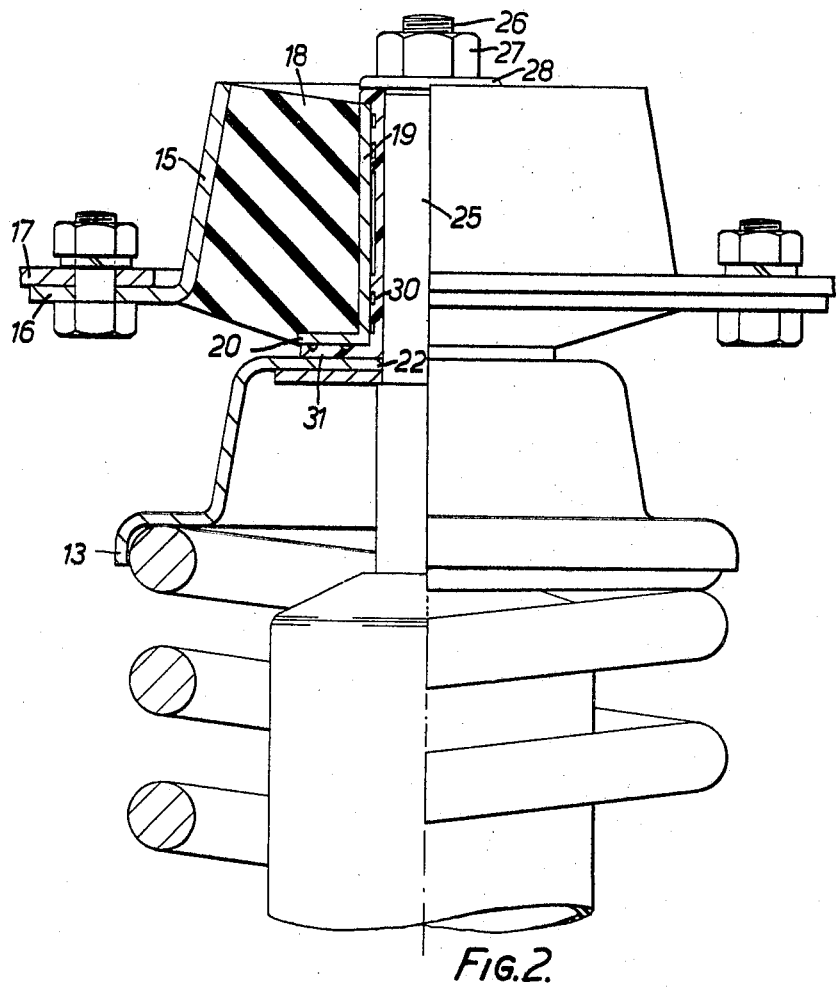
Figure 3:
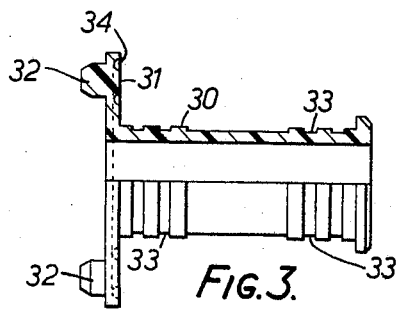
Figure 4:
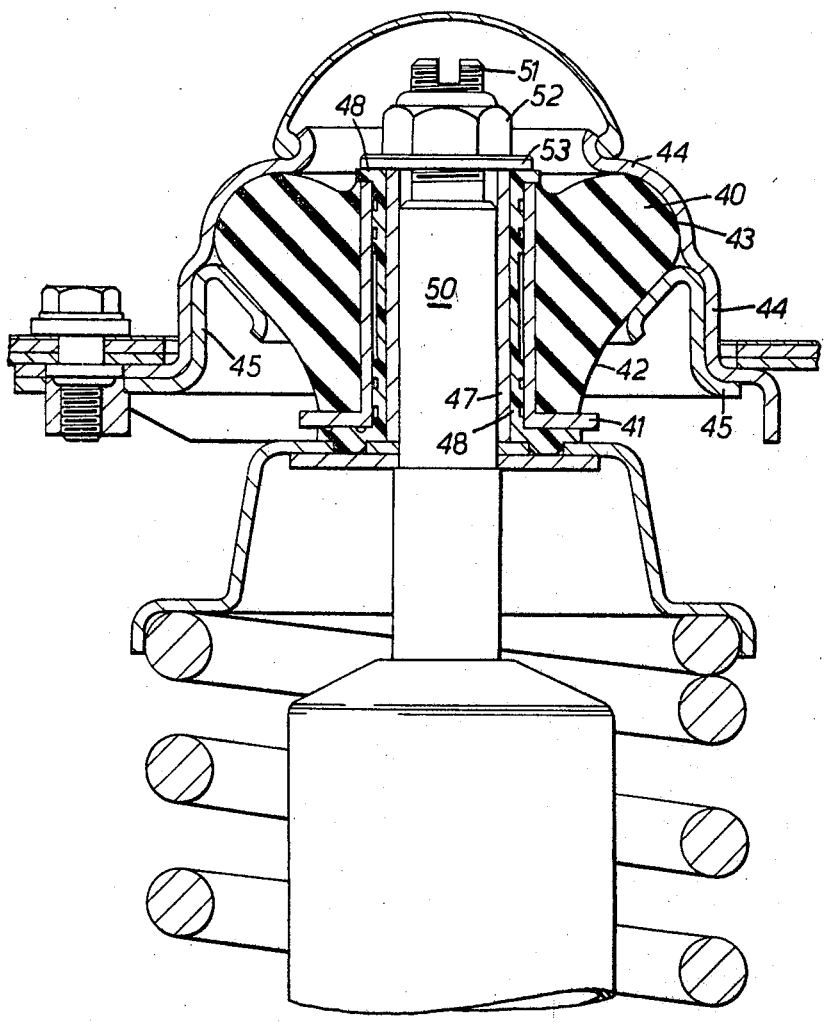

The invention may be carried into practice in various ways but two specific embodiments will now be described by way of example with reference to the accompanying drawings in which:

FIGURE 1 is a view, partly in cross-section, of a strut type suspension unit according to the present invention, FIGURE 2 is an enlarged view of the upper end of the suspension unit shown in FIGURE 1 showing partly in cross-section details of the mounting, FIGURE 3 is a view, partly in cross-section, through the non-metallic member at the upper end of the unit, and FIGURE 4 is a similar view to FIGURE 2 of an alternative form of flexible mounting.

As shown in FIGURE 1 a strut type suspension unit indicated generally at 1 is rigidly connected at its lower end to a socket 2 in a stub axle assembly 3 supporting a stub axle 4. Also connected to the assembly 3 is an arm 5 the outer end of 6 of which locates the lower end of the strut 1 and permits it and the stub axle assembly to pivot about a substantially longitudinal axis with respect to the strut. The other end of the arm 5 (not shown) is connected to the body or chassis of the vehicle in a manner permitting a limited degree of pivotal movement about a substantially horizontal axis all in conventional manner.

The strut includes an outer member or casing 7 forming a housing for a shock absorber part of the working chamber of which is shown in section at the lower end of the strut at 8. The working chamber contains a piston (not shown) having valve controlled passages therein and by means of which damping is effected, again all in conventional manner. The piston is connected to the lower end of a piston rod 9 the upper end of which is connected to the sprung mass of the vehicle by means of a flexible mounting indicated generally at 10 and hereinafter more fully described. Also connected adjacent the upper end of the piston rod is a dirt shield 11 protecting the upper end of the shock absorber against the ingress of dirt.

Connected to the outer casing 7 at a point intermediate in its length is a lower spring retaining member 11A retaining the lower end of a coil spring 12 the upper end of which is retained in an upper spring retaining member 13 in the form of an inverted cup shaped member connected to the upper end of the piston rod.

The flexible mounting 10 at the upper end of the strut is shown more clearly in FIGURE 2 and comprises a generally frusto-conical member 15 having a radially extending flange 16 connected to a part of the vehicle body 17 while bonded to the inner periphery of the frusto-conical member 15 is the outer periphery of a bushing 18 the inner periphery of which is tubular and is bonded to a metal sleeve 19 having a radially directed flange 20 at its lower end.

The upper end of the inverted cup shaped member 13 has a flat annular part or flange arranged parallel to and spaced below the outwardly directed flange 20.

The upper end of the piston rod 9 of the suspension unit has a pin 25 connected thereto and which extends into the sleeve 19 and is provide with a screw threaded part 26 at its upper end upon which a retaining nut 27 and washer 28 are screwed to retain the pin in position in the sleeve 19.

Interposed between the sleeve 19 and its associated outwardly directed flange 20 and the pin 25 and the part 22 of the cup shaped member 13 is a non-metallic material, such as polyurethane, in the form of a permanetly lubricated bearing. The form of the permanently lubricated bearings is shown more clearly in FIGURE 3 and comprises a main part 30 which is interposed between the sleeve 17 and the pin 25, and a radially extending part 31 which is interposed between the flange 20 and the flange 22. The part 31 is provided with pegs 32 on its lower surface which are received in suitable recesses in the part 22 and serve to retain the part 31 rigidly with respect to the part 22, and thus prevent any relative rotation while the main part 30 receives the pin 25 with a force fit, and is thus also held from movement with respect thereto.

The outer surface of the main part 30 is provided with circumferential grooves 33 while its outwardly directed flange 31 is provided with circular grooves 34, the grooves 33 and 34 being packed with grease or other suitable lubricant. The lubricant once packed into the grooves is there for the life of the bearing and the bearing requires no further lubrication and is not, therefore, subject to the disadvantages incurred in constructions at present in use where dirt and water thrown up from the road wheels of the vehicle tend to enter and cause corrosion and abrasion of the roller or ball bearings.

An alternative form of flexible mounting for connecting the upper end of a strut type suspension unit to the sprung mass of a vehicle is shown in FIGURE 4. In this construction the flexible bushing 40 has rigidly secured to its hollow interior a sleeve 41 similar to the sleeve 20 shown in FIGURE 2, while the outer periphery of the flexible bushing has an outer upwardly and outwardly extending part 42 of generally arcuate form in section and a further part 43 also generally arcuate in section but extending inwardly to join the upper end of the sleeve 41. Connected to the sprung mass of the vehicle are two parts 44 and 45 of the form shown and which respectively engage and are secured to the parts 43 and 42 to retain the bushing 40.

A sleeve 47 co-axial with the sleeve 41 is located inside the latter sleeve and interposed between the sleeve 41 and the sleeve 47 is a non-metallic material 48 in the form of a permanently lubricated bearing and similar to that shown in FIGURES 1 to 3. The sleeve 47 is arranged to be a force fit within the non-metallic material 48. The upper end of the suspension unit is provided with a pin 50 of substantially the same diameter as the interior of the sleeve 47 and extending to a point adjacent but spaced below the upper end of the sleeve 48 while connected to the pin 47 or formed integrally therewith is a screw-threaded part 51 upon which is threaded a nut 52 and washer 53 so that pin 50 can be retained in position.

What I claim as my invention and desire to secure by Letters Patent is:

1. A combined resilient and pivotal connection unit for the connection of the upper end of a steerable vehicle wheel suspension unit to the sprung mass of a vehicle comprising a flexible tubular bushing connected at its outer periphery to the sprung mass of the vehicle, a sleeve rigidly secured to the inner periphery of said bushing and having an outwardly directed first flange at its lower end, an elongated pin mounted on the upper end of the suspension unit and received within said sleeve, a second flange on the suspension unit surrounding said pin and extending substantially parallel to and spaced below said outwardly directed first flange on said sleeve, and a non-metallic, permanently lubricated bearing having a main elongated body portion interposed between said sleeve and said pin, said bearing further having an outwardly directed third flange at its lower end interposed between said first flange and said second flange, said body portion being provided with a number of circumferential grooves along its outer periphery and said third flange being provided with a number of grooves along its surface facing said first flange, each of said grooves receiving a quantity of lubricant whereby said bearing is rendered permanently lubricated for extending the useful life thereof.

2. A unit as claimed in claim 1 in which said bearing is fixed with respect to said pin thereby permitting relative rotation between said bearing and said sleeve with its first flange.

3. A unit as claimed in claim 2 in which the underside of said third flange is provided with projecting studs engaging openings in said second flange on the suspension unit.

4. A unit as claimed in claim 1 in which an inner sleeve is interposed between said body portion and said pin.

References Cited

UNITED STATES PATENTS

| | | | |
|---|---|---|---|
| 3,042,393 | 7/1962 | Heiss et al. | 267—35 |
| 3,165,306 | 1/1965 | Tea | 267—35 XR |
| 3,343,770 | 9/1967 | Szonn | 267—1 |

ARTHUR LA POINT, Primary Examiner

HOWARD BELTRAN, Assistant Examiner

U.S. Cl. X.R.

267—1, 33, 34